(12) United States Patent
Romano

(10) Patent No.: US 10,858,175 B2
(45) Date of Patent: Dec. 8, 2020

(54) PROCESS FOR MAKING A SHEET FOR PACKAGING FOODSTUFF PRODUCTS

(71) Applicant: SOREMARTEC S.A., Findel (LU)

(72) Inventor: Igor Romano, Alba (IT)

(73) Assignee: SOREMARTEC S.A., Findel (LU)

( * ) Notice: Subject to any disclaimer, the term of this patent is extended or adjusted under 35 U.S.C. 154(b) by 1106 days.

(21) Appl. No.: 14/651,797

(22) PCT Filed: Dec. 13, 2013

(86) PCT No.: PCT/IB2013/060915
§ 371 (c)(1),
(2) Date: Jun. 12, 2015

(87) PCT Pub. No.: WO2014/091459
PCT Pub. Date: Jun. 19, 2014

(65) Prior Publication Data
US 2015/0329279 A1    Nov. 19, 2015

(30) Foreign Application Priority Data
Dec. 14, 2012   (IT) .............. TO2012A1079

(51) Int. Cl.
*B65D 85/60*     (2006.01)
*B32B 37/14*     (2006.01)
(Continued)

(52) U.S. Cl.
CPC .............. *B65D 85/60* (2013.01); *B32B 37/14* (2013.01); *B41M 3/06* (2013.01); *B65D 65/42* (2013.01);
(Continued)

(58) Field of Classification Search
None
See application file for complete search history.

(56) References Cited

U.S. PATENT DOCUMENTS

| 2008/0199570 A1* | 8/2008 | Milano | ................ B65B 11/50 426/123 |
| 2011/0000802 A1* | 1/2011 | Weiss | ................ B65D 65/42 206/242 |

(Continued)

FOREIGN PATENT DOCUMENTS

| CN | 1441720 A | 9/2003 |
| CN | 102470951 A | 5/2012 |

(Continued)

OTHER PUBLICATIONS

Notification of the First Office Action issued in Chinese Application No. 201380064979.2, dated May 25, 2016, 18 pages.

*Primary Examiner* — Michael P. Rodriguez
(74) *Attorney, Agent, or Firm* — Rothwell, Figg, Ernst & Manbeck, P.C.

(57) ABSTRACT

A process for making a sheet for packaging a foodstuff product, in particular a confectionery product, comprising the steps of:
  providing a sheet material (4; 101) having a first side and a second side opposite to one another; and
  providing on said first side a surface structure having an array of formations in relief (2).
The process is characterized in that the step of providing said array of formations in relief envisages application on said first side of a discontinuous coating (2; 106) and/or a coating having a variable thickness that forms said array of formations in relief.

14 Claims, 4 Drawing Sheets

(51) Int. Cl.
  *B65D 65/42* (2006.01)
  *B41M 3/06* (2006.01)
  *B65D 85/36* (2006.01)
  *B41M 1/10* (2006.01)

(52) U.S. Cl.
  CPC ............... *B65D 85/36* (2013.01); *B41M 1/10* (2013.01); *Y10T 428/24355* (2015.01)

(56) References Cited

U.S. PATENT DOCUMENTS

2011/0278370 A1* 11/2011 Glydon .................... B65D 5/38
  239/6
2012/0117921 A1* 5/2012 Toft .................... B29C 65/3656
  53/452

FOREIGN PATENT DOCUMENTS

| | | |
|---|---|---|
| DE | 102010052075 A1 | 5/2011 |
| EP | 1669205 A1 | 6/2006 |
| EP | 2161315 A1 | 3/2010 |
| WO | 0187587 A1 | 11/2001 |
| WO | 2011/001200 A1 | 1/2011 |
| WO | 2011001200 A1 | 1/2011 |

\* cited by examiner

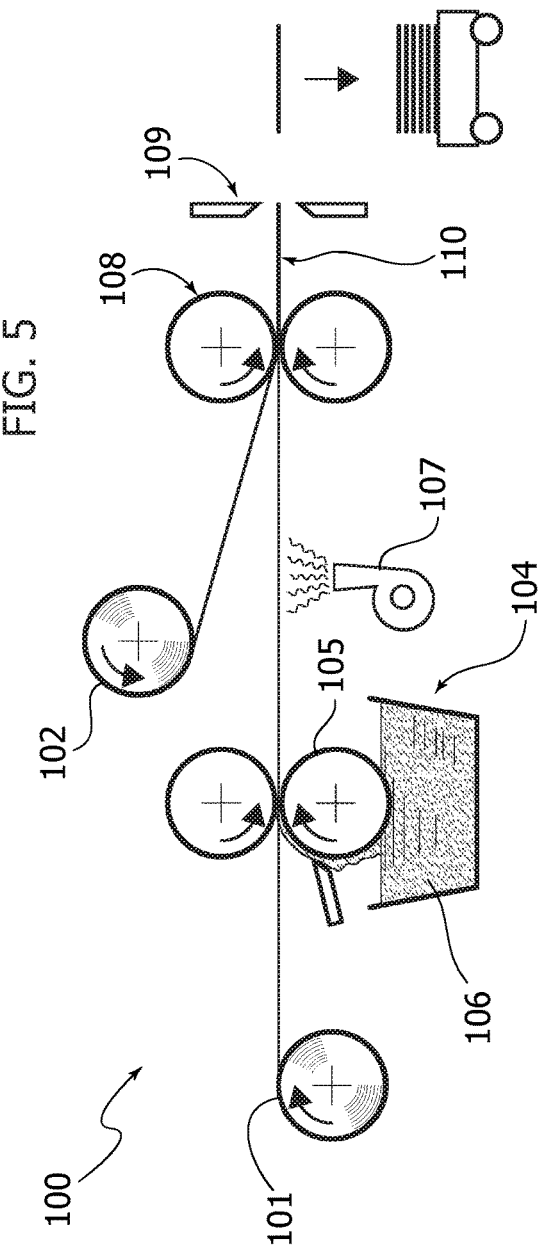
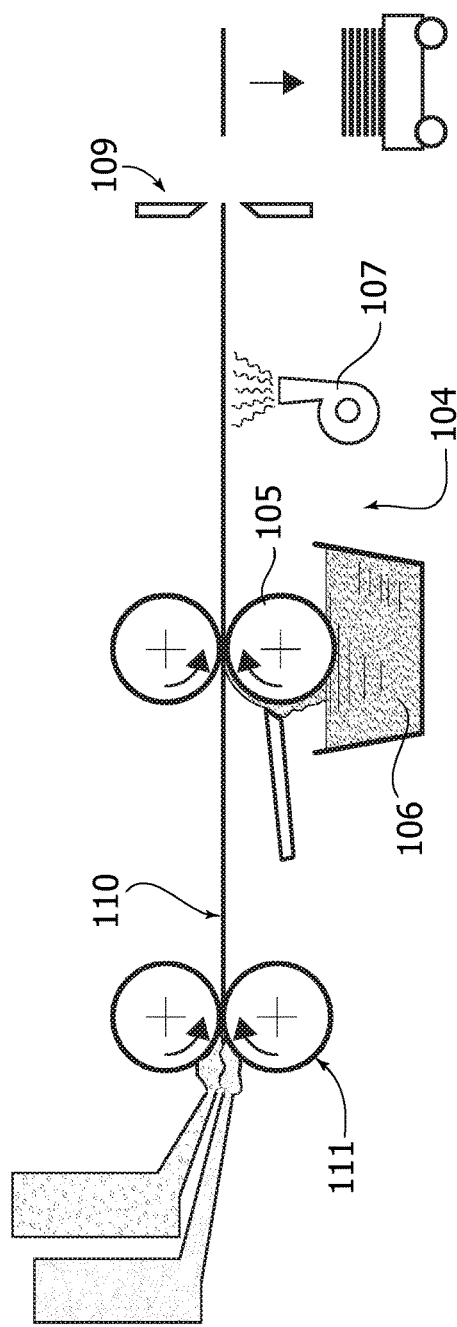

PROCESS FOR MAKING A SHEET FOR PACKAGING FOODSTUFF PRODUCTS

CROSS REFERENCE TO RELATED APPLICATIONS

This application is a 35 U.S.C. § 371 National Phase Entry Application from PCT/IB2013/060915, filed Dec. 13, 2013, and designating the United States, which claims priority under 35 U.S.C. § 119 to Italian Patent Application No. TO2012A001079 filed on Dec. 14, 2012, which is incorporated herein by reference in its entirety.

FIELD OF THE INVENTION

The present invention relates to a process for making a sheet for packaging foodstuff products, in particular confectionery products, of the type comprising the steps of:

providing a sheet material having a first side and a second side opposite to one another; and providing on said first side a surface structure having a series of formations in relief designed to bestow on said side a visual and tactile effect of roughness.

DESCRIPTION OF THE RELEVANT ART

The aforesaid surface structure has substantially aesthetic purposes. In particularly appreciated embodiments, this structure recreates a regular and uniform, spotted, three-dimensional effect, which increases considerably the aesthetic value of the sheet on which it is reproduced.

A sheet of this sort can be used both for wrapping the product directly and for wrapping a box containing a plurality of products. These solutions are both widely used in the field of confectionery products. In this field, a gilded sheet of aluminium foil with the aforementioned visual and tactile effect is universally recognized as being the wrapping material used by the company Ferrero for packaging its pralines Ferrero Rocher®.

To provide the aforesaid surface structure, known processes envisage the use of the embossing technique, which, as is known, envisages impressing on the sheet being processed the forms in relief present on the outer surface of a cylinder against which the aforesaid sheet is pressed.

A satisfactory aesthetic effect is obtained only using materials having marked properties of plastic deformability, such as aluminium foil. Materials of this type that can be used in wrapping foodstuff products are, however, limited.

Furthermore, in various sectors of the packaging industry, and especially in the sector of the packaging of foodstuff products there is an increasingly marked trend to pass from wrapping materials in aluminium foil or the like (as traditionally used for the packaging of confectionery products) to laminated plastic materials of various nature, with a base of propylene, polythene, etc. As compared to traditional materials such as aluminium, these materials present advantages, such as a greater capacity of performing a barrier function (hence a protective function) in regard to: i) penetration in the package of external agents; and/or ii) migration on the outside of the package of agents contained therein. A further factor is that these materials present better possibilities of disposal, with a lower environmental impact than traditional packaging materials.

As compared to aluminium foil, plastic wrapping materials have, however, proven unsuited to being processed via embossing operations.

On the other hand, sheets of aluminium foil used in the packaging of foodstuff products present the drawback of having a non-load-bearing structure, thus entailing the need to be associated to a rigid or semi-rigid case in the cases where it is desired to provide packages of the box type having an outer cover with the aforesaid embossed-like effect.

OBJECT AND SUMMARY OF THE INVENTION

The object of present invention is to provide a process of the type referred to at the start that will overcome one or more of the aforementioned drawbacks.

According to the present invention, the above object is achieved thanks to a process having the characteristics recalled in the ensuing claims. The invention also relates to a corresponding sheet of packaging material and a housing element obtained from said sheet of packaging material. The claims form an integral part of the technical teaching provided herein in relation to the invention.

BRIEF DESCRIPTION OF THE ANNEXED DRAWINGS

The invention will now be described, purely by way of non-limiting example, with reference to the annexed drawings, wherein:

FIG. 5 illustrates an example of a plant for implementing an embodiment of the process described herein; and FIG. 6 illustrates an example of a plant for implementing a further embodiment of the process described herein.

DETAILED DESCRIPTION OF EXAMPLES OF EMBODIMENT

Figure 1:
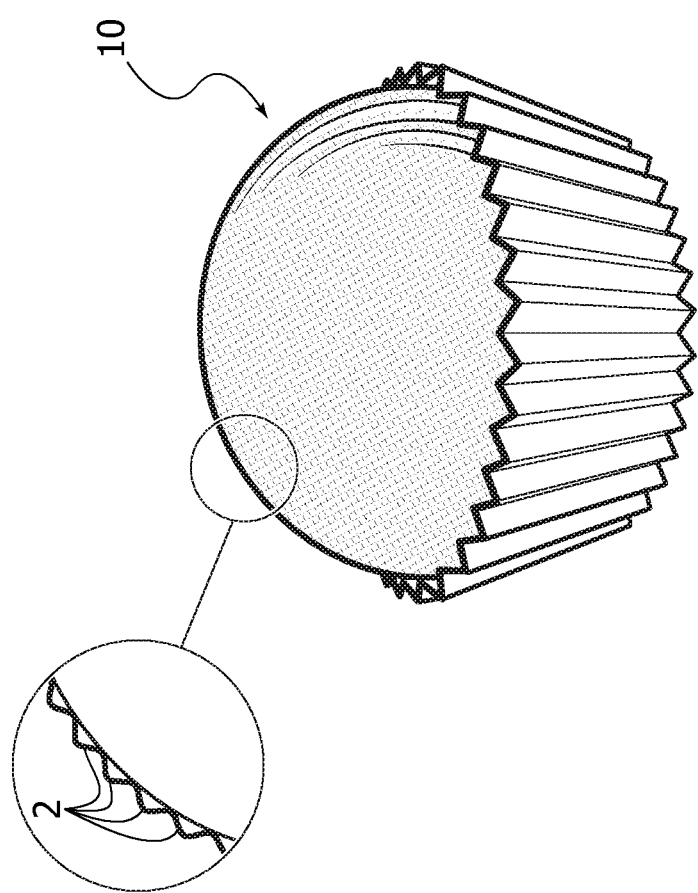
FIG. 1 illustrates a first example of package that can be obtained with the sheet of packaging material described herein, together with a detail of this sheet in cross-sectional view.

In the ensuing description, various specific details are illustrated aimed at providing an in-depth understanding of the embodiments. The embodiments may be provided without one or more of the specific details, or with other methods, components, or materials, etc. In other cases, known structures, materials, or operations are not illustrated or described in detail so that various aspects of the embodiment will not be obscured.

The references used herein are provided only for convenience and hence do not define the sphere of protection or the scope of the embodiments.

The process described herein aims at providing a sheet for packaging foodstuff products, in particular confectionery products.

In particular, the above process has the purpose of providing, in a simple and inexpensive way, a sheet of packaging material having a surface structure constituted by an array of formations in relief, which will be such as to determine on the sheet a visual and tactile effect of roughness resembling the effect mentioned previously that can be obtained on aluminium foil via embossing, but without, however, making use of this type of process.

In general, the effect sought is determined by a surface that has a roughness of between 5 μm and 200 μm. Particularly appreciated embodiments envisage a regular and uniform three-dimensional spotted effect.

To make a sheet of packaging material of the type referred to above, the process described herein envisages:

providing a sheet of material having a first side and a second side opposite to one another; and applying on the aforesaid first side a discontinuous coating, or else a coating having a variable thickness, which forms the aforesaid array of formations in relief.

In view of the foregoing, the process described herein is characterized in that the array of formations in relief is obtained, not by plastic deformation of the sheet material as occurs in an embossing process, but by transferring onto it a surface layer having a conformation that reproduces such an array.

The process described herein thus affords the major advantage of being able to use substantially any type of sheet material, provided, obviously, that is suited to the use in the field of packaging of foodstuff products, using simple means that are able to guarantee a high productivity. The sheet material may, for example, be constituted by polypropylene or polyester or polyethylene or cardboard or polylactide or aluminium foil or polyamide or paper or else a combination of these, and, in general, by any printable material, possibly also treated with metallizations and lacquers; it may be a mono-material or else a composite material with laminar structure.

In various embodiments, the aforesaid coating is constituted by a particular type of paint. The paint in question comprises mineral fillers, preferably constituted substantially by quartz, silica, or else mica, having a grain size preferably comprised between 15 μm and 150 μm. The binding part of the paint may be of any type (for example, vinyl, polyurethane, cellulose resins, etc.), as likewise the solvent medium, which may be constituted by a single component (for example, ethyl acetate, water, etc.) or else by a mixture of various components (for example, ethyl acetate and methyl ketone, etc.). In various embodiments, the paint also contains pigments designed to bestow a specific colouring thereon. The paint may moreover present additives of various nature designed to impart particular characteristics; for example, the paint may contain accelerating agents (for example, isocyanate catalysts) designed to favour crosslinking of the paint after that it has been applied, as likewise elements that bestow resistance to welding and against scratches. In preferred embodiments, the paint may contain amorphous silica with particles having a grain size of between 30 μm and 42 μm, a content of silicon dioxide higher than 90%, and a pH comprised between 5 and 9.

In these embodiments, the process hence envisages application on the sheet material being processed of a continuous or discontinuous layer of paint that will reproduce the aforesaid surface structure.

In various preferred embodiments, this paint is applied on the sheet material via a technique of printing, preferably rotogravure printing, flexographic printing, offset printing, or similar techniques. In this way, the advantage is obtained of being able to use machinery that is normally already present in plants for producing packaging material.

In various embodiments, for printing the sheet material with the above paint, a cylinder or roll is provided, on the outer surface of which an array of cavities is provided that reproduces in negative the array of formations in relief that it is intended to obtain. The shape and arrangement of the formations in relief will substantially correspond to the shape and arrangement of the cavities of the cylinder. By machining the cylinder appropriately it is hence possible to obtain formations in relief with the most disparate shapes and arrangements according to the visual and tactile effect that is to be generated.

Figure 3:
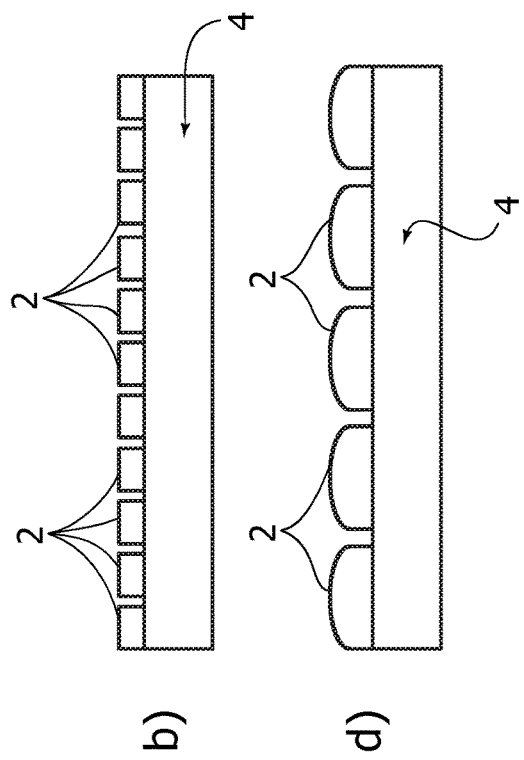
FIG. 3 illustrates different examples of vertical profiles that can present the formations in relief of the sheet described herein.

FIG. 3 illustrates various examples of vertical profiles that can present the formations in relief (these are designated by the reference number 2, whilst the sheet material on which they are applied is designated by the reference number 4): illustrated in image a) is a triangular profile; in image b) a rectangular profile; in image c) a substantially dove-tailed profile; and in image d) a substantially semi-elliptical profile.

Figure 4:
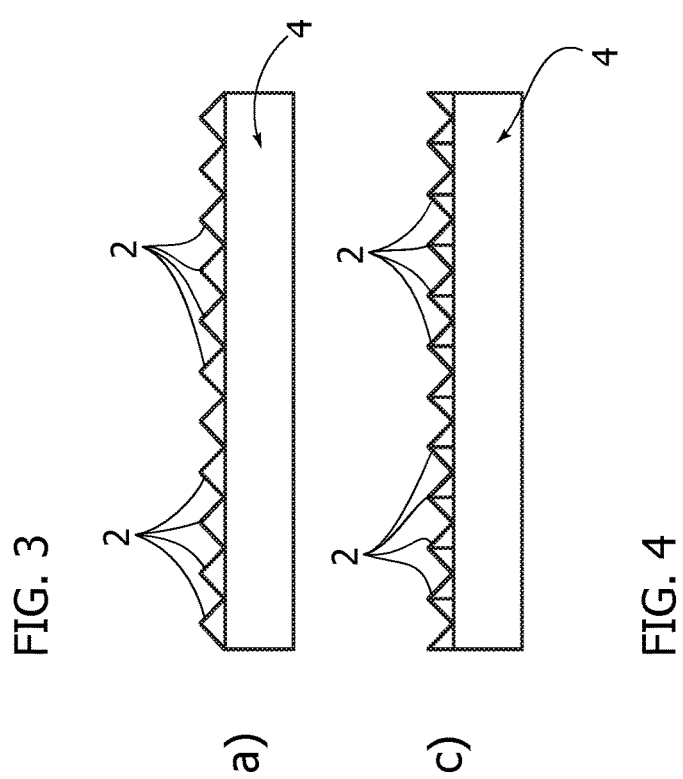
FIG. 4 illustrates different examples of mutual arrangement of the formations in relief of the sheet described herein.
Figure 4:
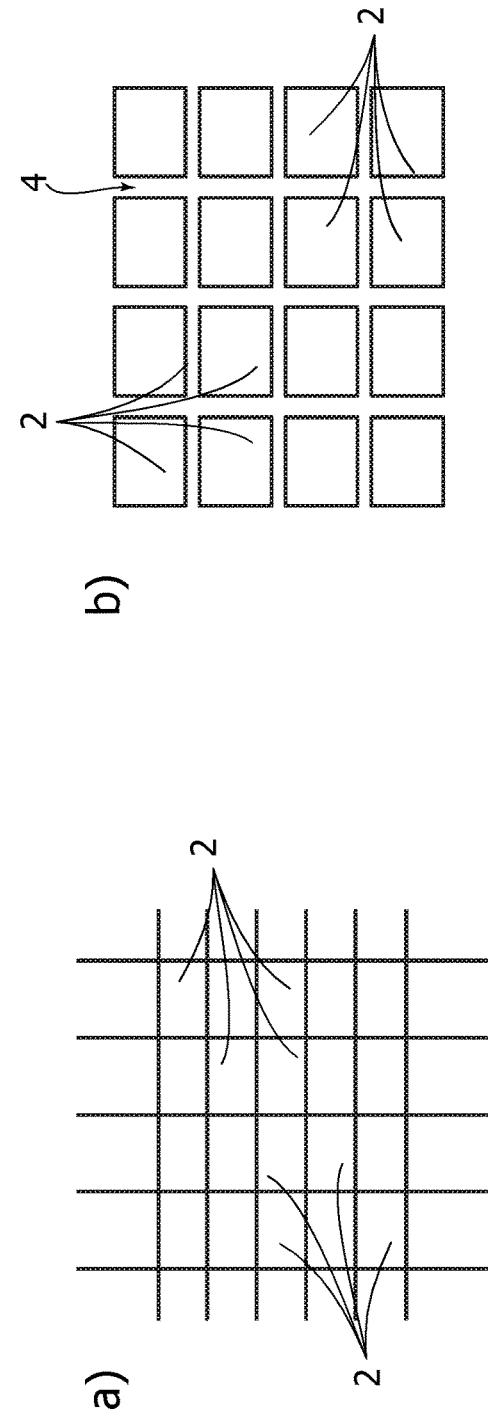

FIG. 4 illustrates, instead, two different types of arrangement of the above formations (once again designated by the reference number 2): illustrated in image a) is an arrangement in which the formations are all in mutual contact on the four sides, whilst illustrated in image b) is an arrangement in which the formations are set at a distance from one another on the four sides, in a uniform way. It is obviously possible to envisage also arrangements in which the formations are set at a distance from one another only in specific directions of the sheet. In general, as may be seen in FIG. 4, the embodiments are in any case preferable in which the formations are arranged, within a given area, according to a reticular configuration, i.e., along a first series of parallel lines and along a second series of lines mutually parallel and orthogonal to the lines of the first series, and in such a way that along these lines the formations are distributed according to a one and the same orderly and uniform sequence.

It may be noted that in the images 3a, 3c and 4a the coating that reproduces the formations 2 is continuous, whilst in the images 3b, 3d, 4b this coating is discontinuous, i.e., set in localized areas, in immediate succession.

The present applicant has found that a particularly satisfactory embossed-like aesthetic effect is obtained in the case where the cavities have a depth of at least 45 μm, preferably between 45 μm and 70 μm, and dimensions in top plan view so that within 1 cm$^2$ there is a number of cavities comprised between 10 and 100, preferably between 30 and 80.

These cavities may be obtained by etching the cylinder using techniques of a known type, for example using laser-etching technology.

In the printing process, the aforesaid cylinder is set partially submerged in the paint referred to above, contained within a tank, and in this condition is made to rotate so as to gather the paint in its cavities, and transfer it onto the sheet material that is pressed against it.

Once applied, the paint is hardened via a drying process, which may, for example, envisage passage of the coated sheet material through an oven at low temperature, for example between 40° C. and 200° C. according to the type of paint and the type of sheet material.

The sheet obtained with the process described herein may be either a sheet of wrapping material or a sheet of packaging material to form semi-rigid housings or housing parts.

Figure 2:
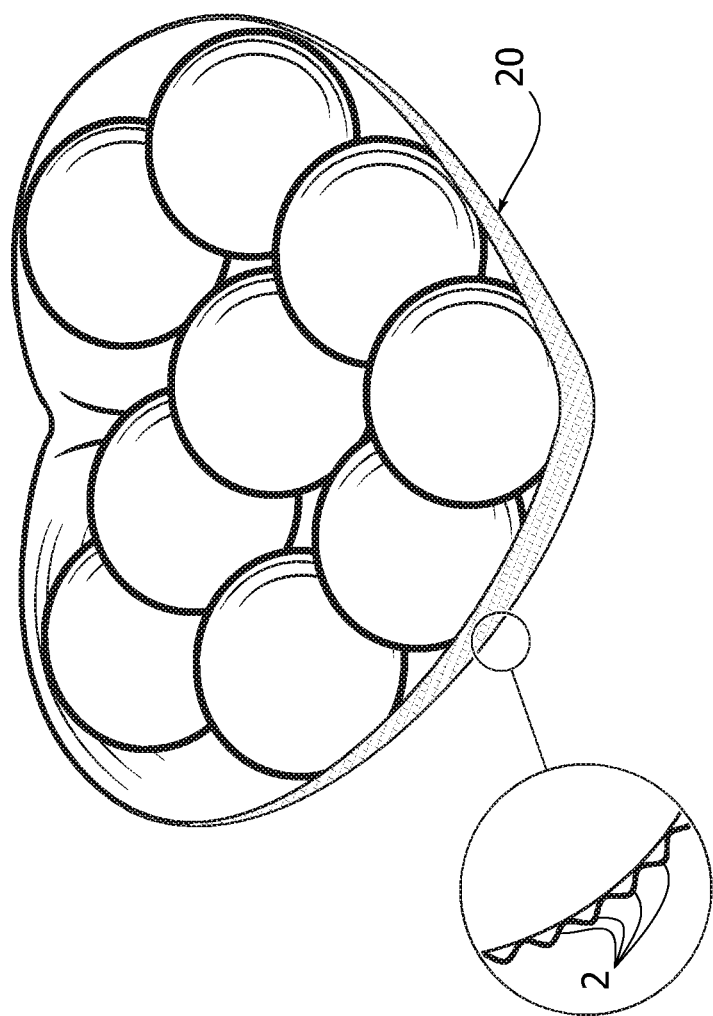
FIG. 2 illustrates a second example of package that can be obtained with the sheet of packaging material described herein, together with a detail of this sheet in cross-sectional view.

FIGS. 1 and 2 illustrate two respective examples of use of the above two variant embodiments of the sheet in question.

FIG. 1 illustrates a package for a single praline, formed with a sheet of wrapping material 10 obtained with the process described herein. The outer side of this package exhibits the aforesaid surface structure with the formations in relief 2.

The use of the process described herein for obtaining a sheet of wrapping material of this sort, affords the advantage that the sheet, in addition to presenting the desired aesthetic effect, may also be constituted by those plastic materials described at the start, which are unsuited to a proper embossing process, given that the process described herein does not present, as mentioned above, any limitation as regards the type of material that can be used. The sheet in question may thus present all the advantageous properties of these materials in order to be able to preserve and protect each specific product in an optimal way according to the applications. For instance, the sheet of wrapping material may comprise a layer of polythene or similar materials having heat-sealing characteristics, hence affording the possibility of providing hermetic packages that are able to preserve the product longer. In the same way, it may comprise materials that are able to perform in an optimal way a barrier function in regard to penetration in the package of external agents and/or to migration outside the package of agents contained therein.

FIG. 2 illustrates, instead, a receptacle-like housing containing a plurality of pralines, made of a semi-rigid sheet 20, which is also obtained with the process described herein. By the term "semi-rigid" as used herein is meant a consistency of the sheet that is such as to enable it to be self-supporting. This housing may, for example, be associated to a lid (not illustrated in the figures) so as to form a package of the box type. The outer side of the housing exhibits the aforesaid surface structure with the formations in relief 2. It is to be noted, in this connection, that so far known housings of this type, for example obtained by thermoforming of a sheet of plastic material, at most could present decorative shapes such as crowns or undulations, deriving from the presence of similar shapes in the matrix of the die used in the forming process, but certainly did not have any way of exhibiting an array of formations that were able to reproduce an embossed-like effect.

To obtain the sheet of packaging material for this specific application, the process described herein envisages coupling to the sheet material referred to above, on which the coating is applied, a further sheet material so as to obtain a semi-rigid and plastically deformable composite sheet with laminar structure.

In various embodiments, at least one of the two sheet materials is made of plastic material. In various embodiments, the two sheet materials are, for example, constituted by polyester, or polyamide, or polylactide, or polypropylene, or polyethylene, or polystyrene, or polyvinyl chloride, or paper, or else a combination of these, and, possibly, are treated with processes of metallization and/or lacquering. The two sheet materials may be of one and the same type or else of two different types.

In various preferred embodiments, coupling of the further sheet material is carried out after formation, on the first material, of the coating with embossed-like effect.

In various embodiments, in order to obtain the above particular sheet of packaging material, the process described herein hence envisages:

providing a first sheet material having a first side and a second side opposite to one another;

providing the aforesaid array of formations in relief on the first side; and coupling a further sheet material on said second side of the first sheet material, so as to form the aforesaid composite sheet with laminar structure.

Illustrated schematically in FIG. 5 is an example of a plant for implementing this process. In various embodiments, as in the one illustrated, this plant envisages a processing line 100, fed along which are a first sheet material 101 wound in a reel and a second sheet material 102 wound in a reel. This line comprises a rotogravure printing machine 104 that is traversed only by the first sheet material. The machine uses the printing cylinder and the paint described above (designated in the figures by the numbers 105 and 106, respectively) and has the function of forming, on the sheet, the aforesaid coating with embossed-like effect. This machine further comprises means 107 for drying the paint.

The line then comprises a lamination station 108, set downstream of the printing machine, to which both the first sheet material coated with the aforesaid paint and the second sheet material are brought so as to be coupled together and thus form the aforesaid composite sheet with laminar structure, designated in the figures by the reference number 110. Present downstream of the lamination station are cutting means 109, for separating single sheets from the material 110. Alternatively, it is possible to envisage means for wrapping said material in a reel.

In alternative embodiments, the process described herein may instead envisage obtaining the aforesaid laminar structure prior to formation of the coating with embossed-like effect. Also in this case, the two sheet materials may be coupled via an operation of lamination, or else may be formed directly together, via, for example, a co-extrusion process of the type commonly used in the production of plastic composite materials. FIG. 6 illustrates an example of plant for implementing the process according to this variant (for the elements in common with FIG. 5 the same reference numbers have been used); in this figure, it is possible to identify the co-extrusion station 111, and the printing machine 104.

The present invention also regards the semi-rigid housing or housing element that is formed with the sheet of packaging material described herein.

The above housing comprises a semi-rigid laminar structure, made of:

a first sheet material having a first side and a second side opposite to one another; and a second sheet material coupled on the second side of the first material;

wherein on the first side of the first material a discontinuous coating is present, or else a coating having a variable thickness, which forms an array of formations in relief designed to define a visual and tactile appearance of roughness, corresponding to the embossed-like effect described above.

The housing or housing element in question may present any shape according to the part of package that it comes to constitute. For instance, as in the embodiment of FIG. 2, it may constitute the container of a box-shaped package and, for this purpose, present the conformation of a receptacle or a half-shell suitable for receiving a given number of products, or else may constitute the closing element or lid of the package.

To obtain this housing a traditional packaging line may be used, comprising a thermoforming station designed to shape in the desired form the aforesaid sheet of packaging material.

In view of the foregoing, it is evident how the process described herein is extremely versatile, enabling production of packaging sheets that may even be very different from one another but that can all be characterized by the same embossed-like effect in the same precise reproduction.

The present invention also comprises a process for obtaining a package of a foodstuff product, in particular a confectionery product, which comprises the steps of the process for producing the sheet of packaging material described herein, and moreover envisages a step in which the sheet material, with the coating forming the array of formations in relief applied thereon, is subjected to a thermoforming operation, so as to undergo plastic deformation and assume the desired shape of the package or of a part of the package, or else is subjected to an operation of heat sealing to close hermetically the foodstuff product inside it. These operations may be carried out with the appropriate means commonly used in the technical field in question. It should be noted that, in this application, the use of a paint containing mineral fillers substantially constituted by quartz, and/or mica, and/or silica is particularly effective and advantageous in so far as this type of paint is able to withstand the aforesaid operations of thermoforming or heat sealing, maintaining the desired visual and tactile effect.

Of course, without prejudice to the principle of the invention, the details of construction and the embodiments may vary, even significantly, with respect to what has been illustrated herein purely by way of non-limiting example, without thereby departing from the scope of the invention, as defined by the annexed claims. The process described herein may, for example, provide a packaging sheet of a material that can be subjected to cold or hot plastic deformation. Furthermore, the process described herein may, for example, produce a sheet of packaging material having the aforesaid embossed-like effect on both sides. The process described herein may, in general, produce weldable packaging sheets that are able to provide a high protection against passage of aromas, humidity, and any external agent that might damage the foodstuff product.

The invention claimed is:

1. A process for making a package of a foodstuff product comprising the steps of:
    providing a sheet material having a first side and a second side opposite to one another; and
    providing on said first side a surface structure having an array of formations in relief such as to determine on said material a visual and tactile effect of roughness;
    wherein said step of providing said array of formations in relief comprises application on said first side of a discontinuous coating and/or a coating having a variable thickness that forms said array of formations in relief, said coating being constituted of a paint containing mineral fillers, constituted by quartz and/or mica and/or silica, and in that it comprises a step in which said sheet material with said coating applied thereon is subjected to an operation of thermoforming, so as to undergo plastic deformation and assume the desired shape of the package or of a part of the package, or of heat-sealing, so as to close hermetically the foodstuff product inside it.

2. The process according to claim 1, wherein said mineral fillers have a grain size of between 15 and 150 μm.

3. The process according to claim 1, wherein said step of application of said paint on said first side comprises:
    providing a cylinder, made on the outer surface of which is an array of cavities that substantially reproduces in negative said array of formations in relief;
    filling said cavities with said paint; and
    carrying out an operation of printing, via said cylinder, on said first side of said sheet.

4. The process according to claim 1, wherein coupled to said second side of said sheet material is a further sheet material, so as to form a plastically deformable semi-rigid laminar structure.

5. The process according to claim 1, further comprising coupling to said second side of said sheet material a further sheet material so as to obtain a plastically deformable semi-rigid laminar structure, said coupling step being performed after application of said coating on said first side of said sheet material.

6. The process according to claim 1, further comprising coupling to said second side of said sheet material a further sheet material so as to obtain a plastically deformable semi-rigid laminar structure, said coupling step being performed prior to application of said coating on said first side of said sheet material.

7. The process according to claim 4, further comprising providing said sheet materials coupled together via a co-extrusion process.

8. The process according to claim 5, wherein said step of coupling together said sheet materials is performed via a process of lamination.

9. The process according to claim 4, wherein at least one of the two sheet materials is a plastic material.

10. The process according to claim 1, wherein said surface structure has a roughness of between 5 μm and 200 μm.

11. The process according to claim 1, wherein the foodstuff product comprises a confectionery product.

12. The process according to claim 9, wherein the plastic material comprises one or more of polypropylene, polyester, polyethylene, polylactide, polyamide, polystyrene, and polyvinyl chloride.

13. The process according to claim 9, wherein at least one of the two sheet materials is treated with a process of metallization or lacquering.

14. A process for making a package of a foodstuff product comprising the steps of:
    feeding a first sheet material wound in a first reel along a processing line, the first sheet material being fed towards a rotogravure printing machine comprising first and second printing cylinders and a tank containing a paint, the first and second printing cylinders being in a spaced arrangement and wherein the first printing cylinder is arranged such that the paint from the tank is applied to the first printing cylinder as it rotates;
    forming, on the first sheet material, a coating with embossed-like effect, wherein the forming results from the first sheet material being fed through the first and second printing cylinders;
    drying the paint on the first sheet material;
    feeding a second sheet material wound in a second reel to a lamination station;
    coupling the first sheet material and second sheet material together in the lamination station to form a composite sheet with laminar structure; and
    separating single sheets from the composite sheet with laminar structure,
    wherein the paint comprises mineral fillers, constituted by quartz and/or mica and/or silica.

* * * * *